(12) United States Patent
Arnesen et al.

(10) Patent No.: US 8,322,955 B2
(45) Date of Patent: Dec. 4, 2012

(54) RFID ADAPTER AND RFID ENABLED CARGO PALLET

(75) Inventors: Christian Arnesen, Holmestrand (NO); Nils Martin Teien, Toensberg (NO)

(73) Assignee: Nordisk Aviation Products AS (NO)

( * ) Notice: Subject to any disclaimer, the term of this patent is extended or adjusted under 35 U.S.C. 154(b) by 659 days.

(21) Appl. No.: 12/465,755

(22) Filed: May 14, 2009

(65) Prior Publication Data

US 2010/0288843 A1 Nov. 18, 2010

(51) Int. Cl.
*B60P 7/06* (2006.01)

(52) U.S. Cl. .................. 410/46; 410/105; 248/346.02; 340/572.1; 340/572.8

(58) Field of Classification Search ............... 108/51.11, 108/55.3, 55.5, 55.1; 292/1, 251, DIG. 11, 292/DIG. 60; 410/104, 105, 46, 80; 248/346.02; 220/1.5, 1.6; 340/572.1, 572.8
See application file for complete search history.

(56) References Cited

U.S. PATENT DOCUMENTS

| | | | | |
|---|---|---|---|---|
| 3,344,749 A * | 10/1967 | Bass et al. | ...................... | 410/105 |
| 3,509,832 A * | 5/1970 | Daisley, Jr. | ................. | 108/57.25 |
| 3,591,121 A * | 7/1971 | Parris | ....................... | 248/346.02 |
| 3,622,114 A * | 11/1971 | McIntire, Jr. | ............ | 248/346.02 |
| 4,966,084 A * | 10/1990 | Motomaru | ................... | 108/51.3 |
| 5,284,098 A * | 2/1994 | Klapperich et al. | ......... | 108/55.5 |
| 5,772,369 A * | 6/1998 | Lerman et al. | ................. | 410/96 |
| 5,871,318 A * | 2/1999 | Dixon et al. | .................. | 410/105 |
| 6,308,642 B1 * | 10/2001 | Branam et al. | ............... | 108/55.1 |
| 6,609,466 B2 * | 8/2003 | Salmanson et al. | .......... | 108/55.1 |
| 6,954,982 B2 * | 10/2005 | Isle et al. | ........................ | 29/799 |
| 7,029,215 B2 * | 4/2006 | Dowty | ......................... | 410/105 |
| 7,347,148 B2 * | 3/2008 | Roth et al. | ................. | 108/51.11 |
| 7,357,611 B2 * | 4/2008 | Faivre et al. | .................. | 410/140 |
| 7,420,512 B2 * | 9/2008 | Lannon et al. | ........ | 343/700 MS |
| 7,495,567 B2 * | 2/2009 | Redler et al. | ............... | 340/572.7 |
| 7,517,181 B2 * | 4/2009 | Dunaway et al. | ............ | 410/105 |
| 7,565,868 B2 * | 7/2009 | Relland | ...................... | 108/51.11 |
| 7,594,787 B2 * | 9/2009 | Womack et al. | ............. | 410/104 |
| 7,665,939 B1 * | 2/2010 | Cardona | ....................... | 410/105 |
| 7,713,009 B2 * | 5/2010 | Hudson et al. | ............... | 410/105 |
| 8,011,307 B2 * | 9/2011 | Marcelli | ...................... | 108/55.3 |
| 2001/0015156 A1 * | 8/2001 | Branam et al. | ............... | 108/55.3 |
| 2005/0117991 A1 * | 6/2005 | Anderson et al. | ............ | 410/104 |
| 2005/0132937 A1 * | 6/2005 | Branam | ....................... | 108/55.5 |
| 2006/0257225 A1 * | 11/2006 | Klinkman et al. | ........... | 410/104 |
| 2007/0036628 A1 * | 2/2007 | Womack et al. | ............. | 410/104 |
| 2007/0096920 A1 * | 5/2007 | Cargonja et al. | .......... | 340/572.8 |
| 2007/0296597 A1 * | 12/2007 | Nizzola | ..................... | 340/572.8 |
| 2008/0068179 A1 * | 3/2008 | Meyer | ........................ | 340/572.8 |
| 2008/0099557 A1 * | 5/2008 | James | ........................... | 235/385 |
| 2008/0250986 A1 * | 10/2008 | Boon | ........................... | 108/53.1 |
| 2009/0116925 A1 * | 5/2009 | Juchniewicz et al. | .......... | 410/52 |

* cited by examiner

*Primary Examiner* — Terrell McKinnon
*Assistant Examiner* — Michael McDuffie
(74) *Attorney, Agent, or Firm* — Barnes & Thornburg LLP (57) ABSTRACT

A radio frequency identification ("RFID") apparatus includes a housing configured to mate with a channel of an extruded metal mounting system and a flange extending radially outwardly from the housing. The flange is configured to bear upon a lower portion of a channel lip to retain the housing within the channel. In addition, a seat is disposed within the housing to retain an RFID tag and a lock secures the housing at a particular location along the channel.

16 Claims, 11 Drawing Sheets

RFID ADAPTER AND RFID ENABLED CARGO PALLET

FIELD OF THE INVENTION

The present invention generally relates to a cargo pallet. More particularly, the present invention pertains to a radio frequency identification (RFID) enabled cargo pallet and an RFID adapter for a cargo pallet.

BACKGROUND OF THE INVENTION

Cargo pallets are widely used throughout the shipping industries to facilitate the transportation of goods. These shipping industries (shippers) includes manufactures, transportation companies, retail sales companies, and the like. With the advent of radio frequency identification (RFID) shippers have naturally adapted this technology to assist with tracking these palletized goods. Presently, shippers place RFID transponders in radio frequency (RF) transparent boxes along with the goods or affix RFID labels to the outside of the packaged goods. In addition, RFID transponders are conventionally placed within the framework of RF transparent cargo pallets. For example, wooden pallets are RF transparent and RFID transponders placed within the wooden structure are protected from damage.

Unfortunately, these conventional methods are not applicable for metal pallets—particularly, unit load devices (ULDs) which are metal pallets often used in the airline shipping industries. These metal pallets are typically a single layer of metal with a reinforced edge. As such, there is no internal structure to provide protection for the RFID transponder and, even if a protected location in the reinforced edge could be found, the enclosed metal structure would prevent entry and egress of RF signals.

Accordingly, it is desirable to provide a device and cargo pallet capable of overcoming the disadvantages described herein at least to some extent.

SUMMARY OF THE INVENTION

The foregoing needs are met, at least to a great extent, by the present invention, wherein in one respect an RFID adapter and RFID enabled pallet is provided that in some embodiments facilitates the use of RFID technology in metal cargo pallets.

An embodiment of the present invention pertains to a radio frequency identification ("RFID") apparatus. The RFID apparatus includes a housing configured to mate with a channel of an extruded metal mounting system and a flange extending radially outwardly from the housing. The flange is configured to bear upon a lower portion of a channel lip to retain the housing within the channel. In addition, a seat is disposed within the housing to retain an RFID tag and a lock secures the housing at a particular location along the channel.

Another embodiment of the present invention relates to a RFID cassette. The RFID cassette includes an elongated polymer housing, a first pair of flanges, a recess, and a disk. The elongated polymer housing having a polymer that is essentially transparent to radio signals used to communicate with an RFID tag. The elongated polymer housing includes a top, bottom, a pair of sides extending along a long axis of the elongated polymer housing, and a centerline defined by a plane passing perpendicularly through the top and bottom and at a midpoint between the pair of sides. Each one of the first pair of flanges extends radially outwardly from a respective side of the pair of sides. The recess is disposed in the bottom and includes a clip to retain the RFID tag. The disk is threadedly engaged to the elongated polymer housing. The disk is disposed along the centerline and offset from the first pair of flanges.

Yet another embodiment of the present invention pertains to a RFID pallet system. The RFID pallet system includes a pallet, housing, flange, seat and lock. The pallet includes a panel, edge, and mounting system. The panel is to support a package of cargo. The edge is disposed about a perimeter of the panel. The edge includes an extruded metal rail. The mounting system is integrated into the extruded metal rail. The mounting system includes a channel and a channel lip. The housing is configured to mate with the channel. The flange extends radially outwardly from the housing and is configured to bear upon a lower portion of the channel lip to retain the housing within the channel. The seat is disposed within the housing to retain an RFID tag. The lock is to secure the housing at a particular location along the channel.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

An embodiment of the invention will now be described with reference to the drawing figures, in which like reference numerals refer to like parts throughout. In general, various embodiments of the invention provide a device and system to track an inventory of pallets and/or cargo placed thereon. As used herein, the term, "pallet" refers to a unit load device used to load, transport, and offload freight or other such cargo on transport vehicles such as planes, ships, trains, trucks, and the like. In a particular embodiment, a cassette is configured to integrate into the pallet. As used herein, the term, "cassette" refers to a container such as, for example, a case, magazine, cartridge, and/or the like. In general, the cassette includes a tracking device. Examples of suitable tracking devices include bar codes such as universal product codes ("UPC"), European article number ("EAN"), global trade item number ("GTIN"), radio frequency identification ("RFID") and the like. While any suitable tracking device is within the scope and spirit of embodiments of the invention, in a specific embodiment, the tracking device is an RFID tag. The RFID tag may include any suitable format and communication standard. For example, the RFID tag may utilize a suitable International Organization for Standards ("ISO") standard such as ISO 18185, ISO 18000-2A,2B, or the like. Other suitable transmission standards include standards set by the International Electrotechnical Commission ("IEC"), American Society for Testing and Materials ("ASTM"), etc. Suitable formats include various chip and antenna configurations such as flat films and encapsulated ampoules.

In the specific embodiment set forth herein, example is made of an RFID cassette. As used herein, the term, "RFID cassette" refers to such a cassette configured to retain an RFID tag and further configured to be easily loaded into and unloaded from the extruded metal mounting system. However, as described herein, embodiments are not limited to RFID tags, but rather, any suitable tracking device is within the scope and spirit of the various embodiments of the invention.

Figure 1:
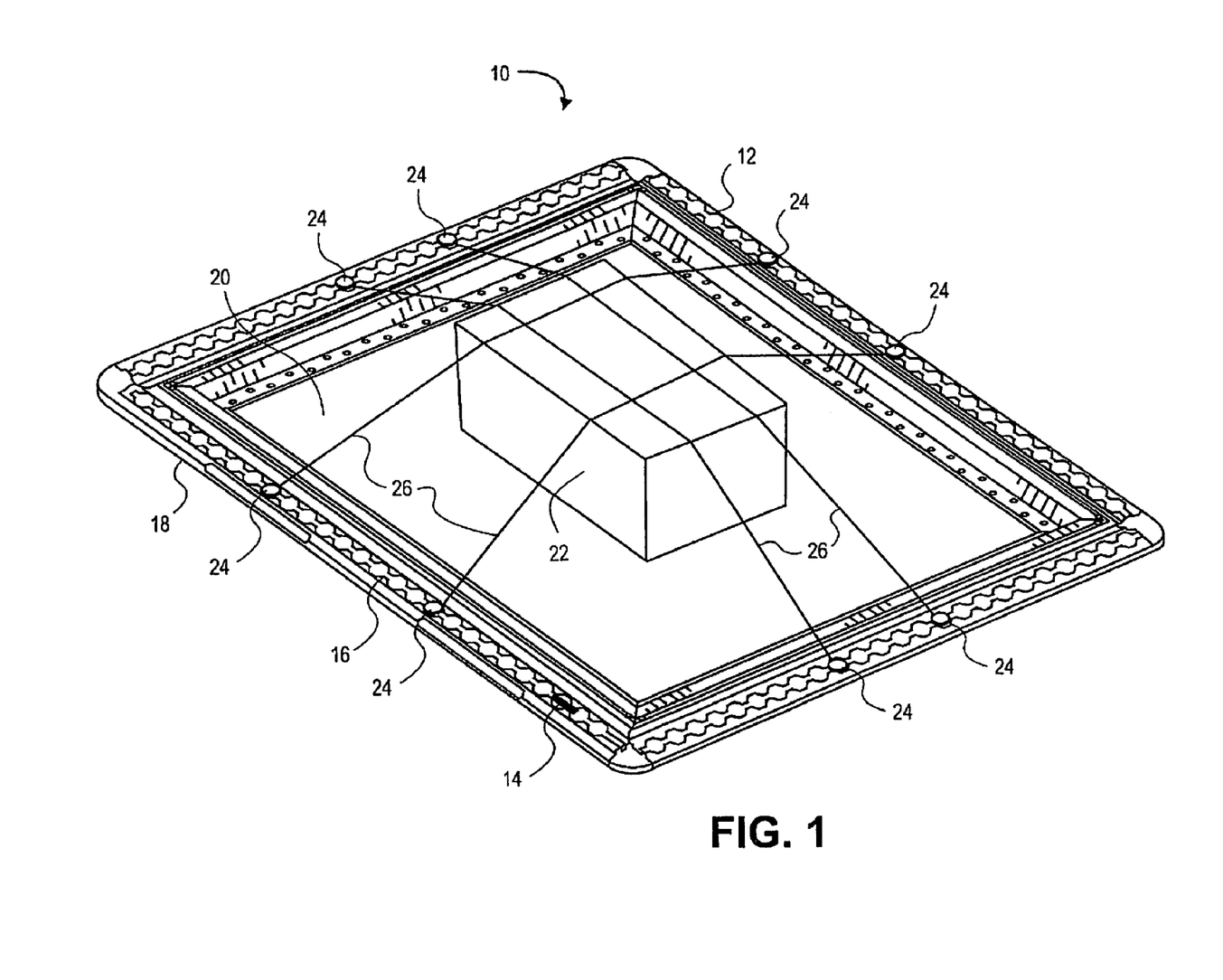
FIG. 1 is a perspective views of a pallet with a radio frequency identification ("RFID") cassette according to an embodiment of the invention.

As shown in FIG. 1 an RFID pallet system 10 includes a pallet 12 and an RFID cassette 14. The pallet 12 includes a mounting system 16 disposed on a reinforced edge 18 at the perimeter of the pallet 12. The pallet 12 further includes a panel 20 secured to the edge 18. In use, cargo 22 is placed on the panel 20 and attachment devices 24 such as "D" rings are secured to the mounting system 16. A webbing 26 (or rope, net, etc.) may be placed over the cargo 22 and tied off at the attachment devices 24 to secure the cargo 22 to the pallet 12. According to an embodiment of the invention, the RFID cassette 14 is configured to lock into the mounting system 16. As described herein, the RFID cassette 14 is configured to easily and securely fasten into the mounting system 16. The RFID cassette 14 is further configured to easily be removed from the mounting system 16. It is an advantage of the RFID cassette 14 that existing pallets such as the pallet 12 can be quickly and easily retrofit with the RFID cassette 14 to facilitate tracking and inventory management.

Figure 2:
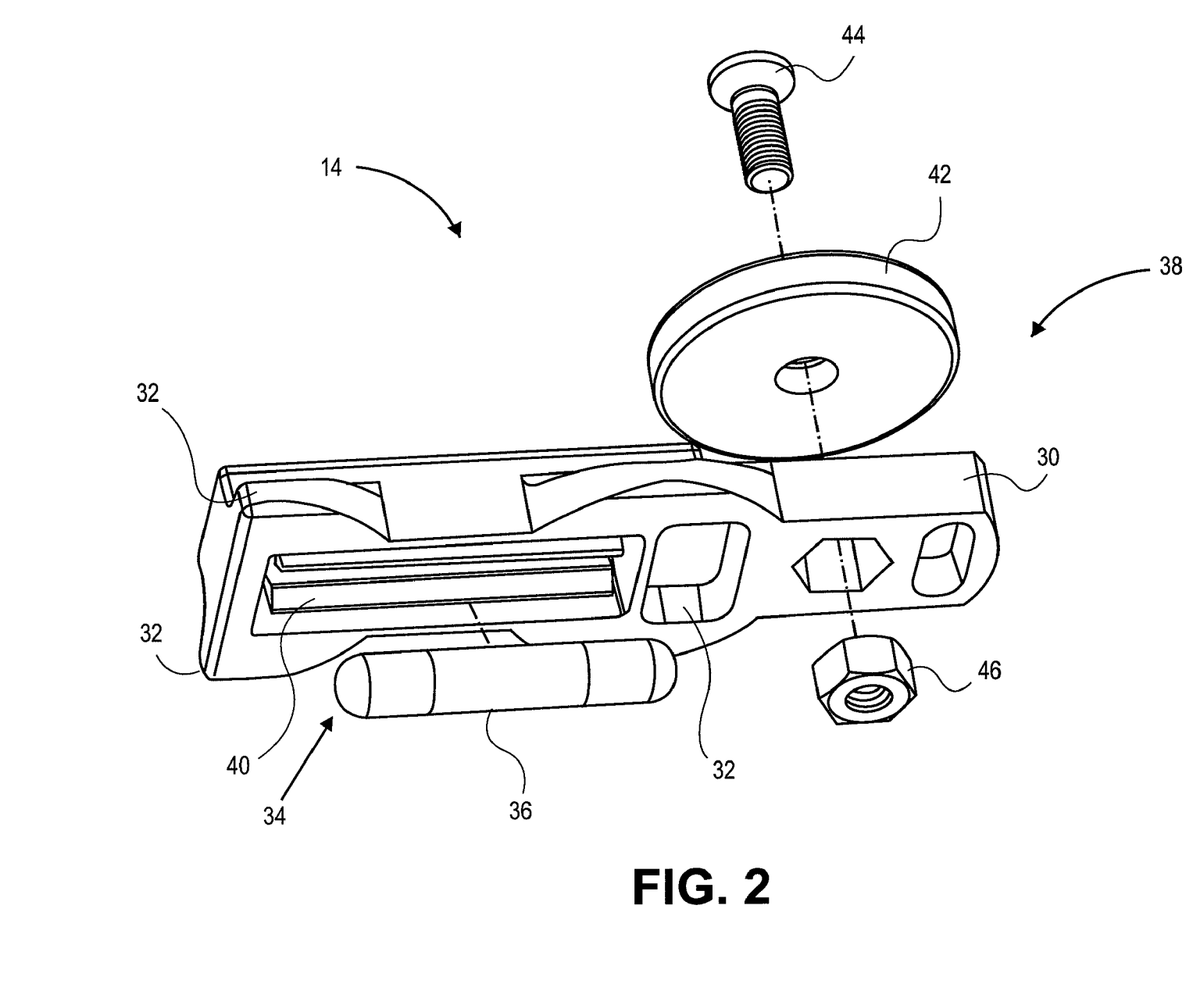
FIG. 2 is an exploded view of the RFID cassette according to FIG. 1.

FIG. 2 is an exploded view of the RFID cassette 14 according to FIG. 1. As shown in FIG. 2, the RFID cassette 14 includes a housing 30, flanges 32, seat 34, RFID tag 36, and lock 38. The housing 30 may include any suitable material. In general, suitable materials include those that allow for the communication between the RFID tag 36 and a conventional RFID reader. Specific examples of suitable materials include polymers and resins such as plastics, epoxies, and the like. A particularly suitable material includes polycarbonate. Properties of polycarbonate that make this material particularly suitable include: 1) As a thermoplastic, polycarbonate is easily worked, molded, and thermoformed; 2) Polycarbonate is very durable; 3) Polycarbonate is inexpensive; 4) Polycarbonate is light weight; 5) Polycarbonate is combustion resistant; and 6) Polycarbonate is already widely used for a variety of aircraft parts and is accepted in the airline industry.

The flanges 32 extend radially outwardly from the housing 30 and, as shown and described herein, are configured to retain the RFID cassette 14 within the mounting system 16. In various embodiments, the flanges 32 may formed together with the housing 30, may be initially formed to a general shape and subsequently milled or otherwise formed to mate with a specific mounting system 16, and/or variously shaped flanges 34 may be interchangeably attached to the housing 30 to accommodate different mounting systems 16.

The seat 34 is configured to accept and retain the RFID tag 36. In a particular example, the seat 34 includes a clip 40 that is recessed into the bottom of the housing. The clip 40 is configured to spread apart in response to the RFID tag 36 being urged therein and clamp the RFID tag 36 to secure the RFID tag 36 therein. The clip 40 may include detents and/or an inwardly protruding lip to facilitate retention of the RFID tag 36. However, in various other examples, the RFID tag 36 may be seated in the RFID cassette 14 via molding the RFID tag 36 integrally into the housing 30, gluing or otherwise affixing the RFID tag 36 into or onto the housing 30, mechanically fastening the RFID tag 36 into or onto the housing 30, and/or the like.

The RFID tag 36 includes any suitable RFID transmitting device or transponder such as active and passive RFID tags. More generally, the RFID tag 36 may include any suitable device configured to transmit or otherwise provide an identifying signal or code. In a particular example, the RFID tag 36 is a glass ampoule type transponder operating at a frequency of 125 thousand cycles per second ("Khz") using communication protocol ISO/IEC 18000-2A,2B.

The lock 38 is configured to secure the RFID cassette 14 to the mounting system 16. In various embodiments, the lock 38 physically prevents the RFID cassette 14 from moving along the mounting system 16 and/or clamps down upon the mounting system 16 to secure the RFID cassette 14 to the mounting system 16. In a particular example, the lock includes a disk 42 secured to the housing 30 by a bolt 44 and nut 46. The nut 46 is captured in a hexagonal recess under the housing 30 and the bolt 44 passes down through a hole in the disk 42 and through a hole in the housing 30 to threadedly engage the nut 46. In this manner, the disk is threadedly secured to the housing 30. In other embodiments, the disk 42 may included a threaded rod extending perpendicularly outward from a plane of the disk 42 and this threaded rod may mate with the nut 46. In yet another embodiment, a threaded rod may extend upward from the housing 30 and mate with a threaded hole in the disk. These examples and any other suitable variation thereof are within the purview of embodiments of the invention.

Figure 3:
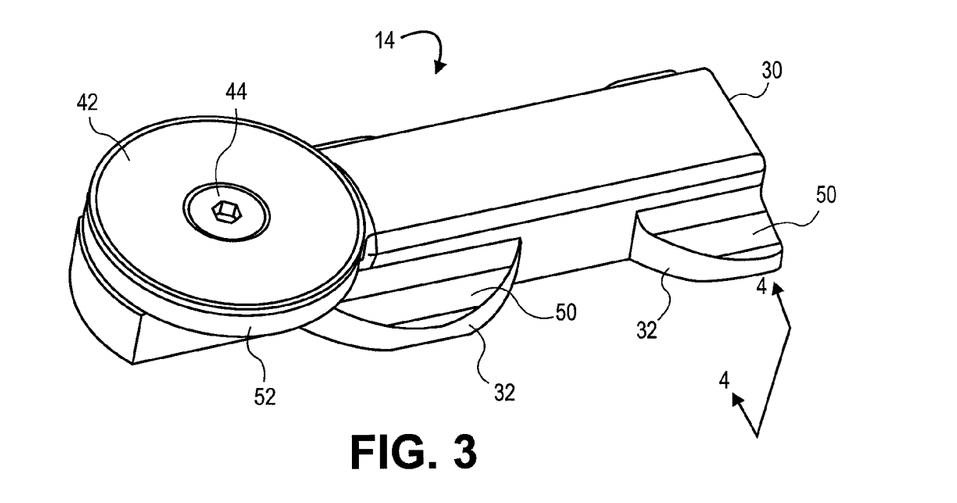
FIG. 3 is a detailed perspective view of the RFID cassette according to FIG. 1.

FIG. 3 is a detailed perspective view of the RFID cassette 14. As shown in FIG. 3, the flanges 32 include upper bearing surfaces 50. Also shown in FIG. 3, the disk 42 includes a side bearing surface 52 that defines an edge perimeter of the disk 42.

Figure 4:
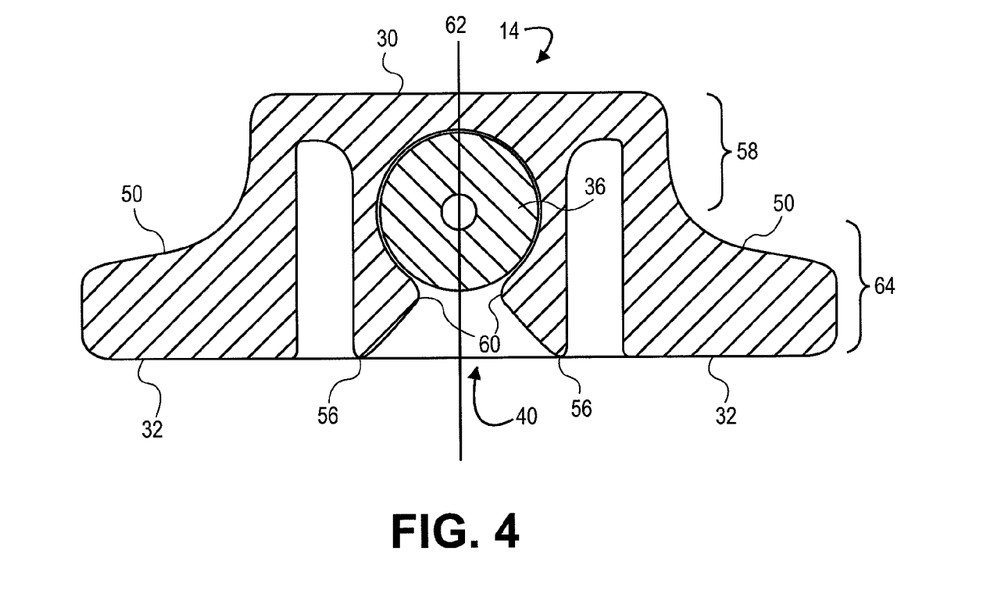
FIG. 4 is a cross sectional view A-A showing the RFID cassette with a suitable RFID tag installed according to FIG. 3

FIG. 4 is a cross sectional view A-A showing the RFID cassette 14 with the RFID tag 36 installed. As shown in FIG. 4, the clip 40 includes a pair of tabs 56 that extend downward from an upper portion 58 of the housing 30. The RFID tag 36 is held in place by respective lips 60 that extend inward towards a centerline 62. In other examples, the tabs may include detents or the like to retain the RFID tag 36. In a particular example, the tabs 56 are disposed symmetrically about the centerline 62. Also shown in FIG. 4, the flanges 32 extend outward from a lower portion 64 of the housing 30.

Figure 5:
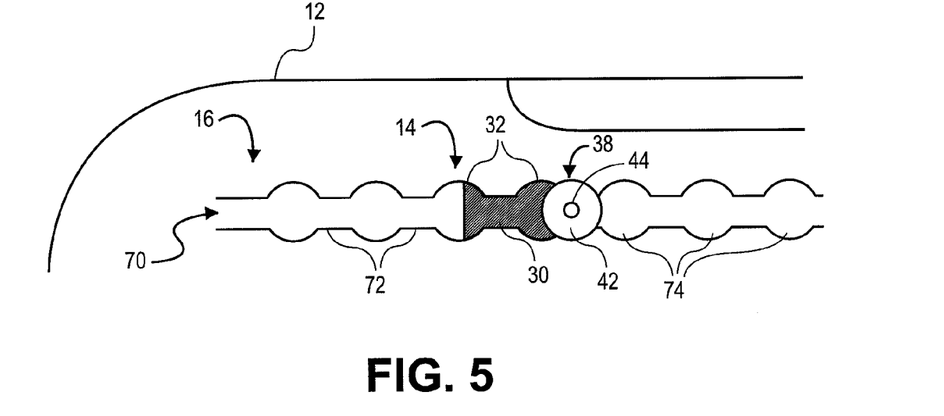
FIG. 5 is a top view of the RFID cassette at an initial installation step according to FIG. 1.

FIG. 5 is a top view of the RFID cassette 14 at an initial installation step according to FIG. 1. As shown in FIG. 5, the mounting system 16 includes a channel 70 and channel lip 72 with regularly spaced cutouts 74. The spacing of flanges 32 along the housing 30 is configured to match the spacing of the cutouts 74. For that matter, the size and shape of the flanges 32 is configured to closely match the size and shape of the cutout 74 while leaving enough tolerance to accommodate slight machining differences.

Of note, when the flanges 32 are in alignment with the cutouts 74, the disk 42 is offset from the cutouts 74. In order to fully seat the housing 30 into the channel 70 so that the flanges 32 are disposed below the channel lip 72 (shown in FIG. 7), the lock 38 is disengaged. For example, the bolt 44 is loosened or removed to allow the disk 42 to be raised or removed from the housing 30.

Figure 6:
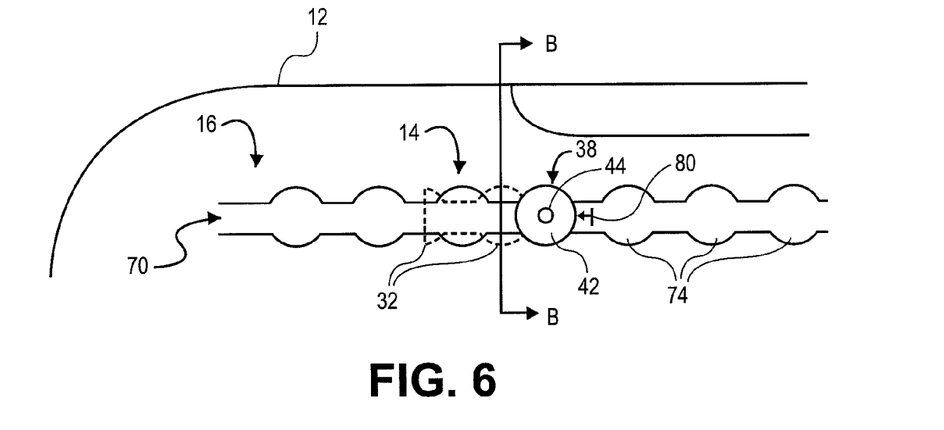
FIG. 6 is a top view of the RFID cassette at an second installation step according to FIG. 1.

FIG. 6 is a top view of the RFID cassette 14 at an second installation step. As shown in FIG. 6, in response to the lock 38 being disengaged, the RFID cassette 14 may be slid along the channel 70. In a particular example, the RFID cassette 14 may be slid approximately ½ the spacing distance between the cutout 74 as indicated by the arrow 80. Once positioned with the lock 38 in alignment with a particular cutout of the cutouts 74, the lock 38 is engaged to secure the RFID cassette in the mounting system 16. For example, the disk 42 is nested down into the cutout 74 and nut 44 is tightened down upon the disk 42 to lock the disk 42. Removing the RFID cassette 14 is performed in a reverse manner as compared to installation.

Figure 7:
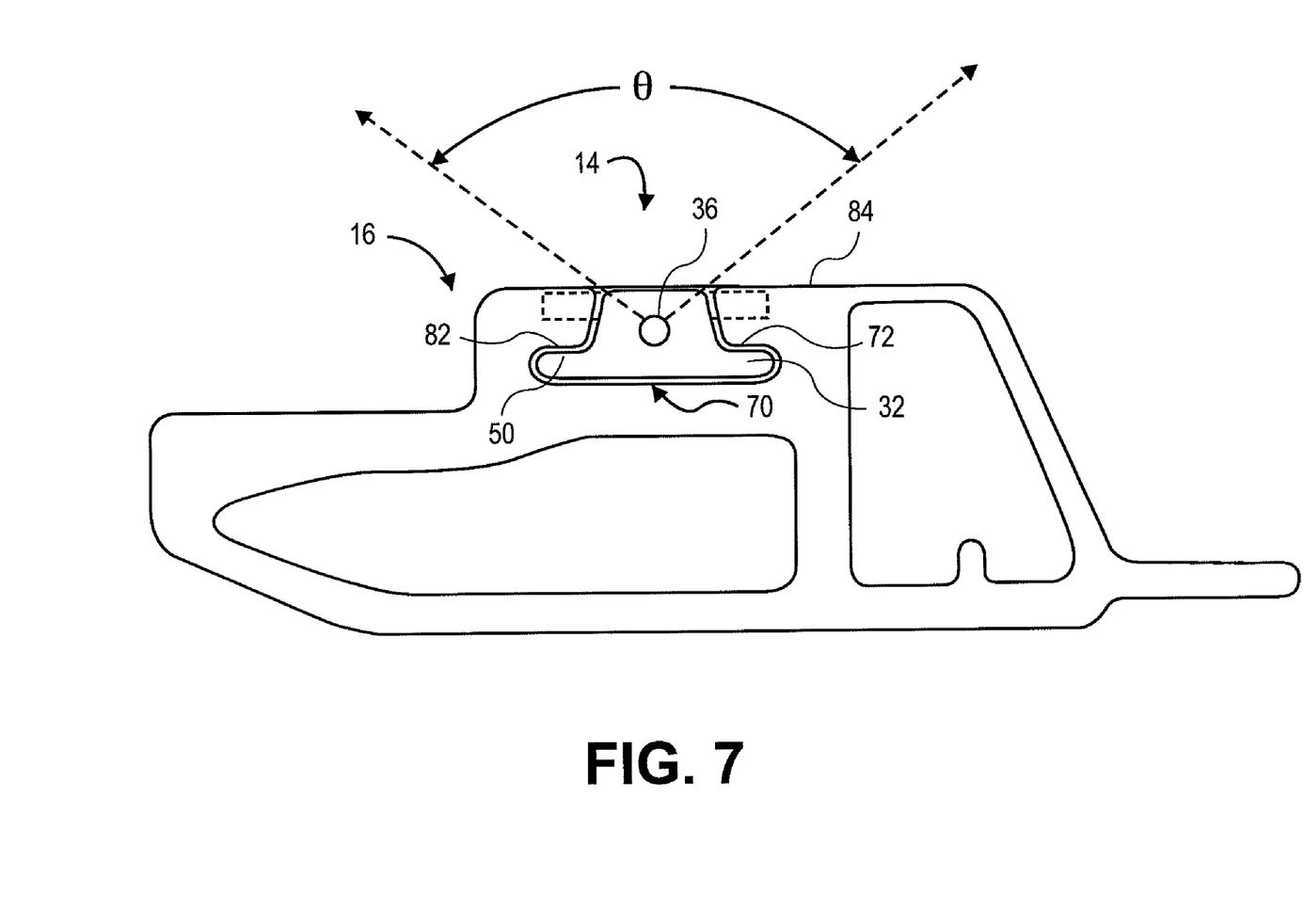
FIG. 7 is a cross sectional view B-B showing the RFID cassette installed in a mounting system according to FIG. 6.

FIG. 7 is a cross sectional view B-B showing the RFID cassette 14 installed in the mounting system 16. As shown in FIG. 7, the RFID cassette 14 mates or nests into the mounting system 16 to protect the RFID cassette 14 while facilitating communication with the RFID tag 36. For example, the RFID cassette 14 is nested into the mounting system 16 via the bearing surface 50 which is in cooperative alignment with a bearing surface 82 disposed on the underside of the channel lip 72. This cooperative alignment entraps the RFID cassette 14 in the mounting system 16. The RFID cassette 14 is protected by virtue of the RFID cassette 14 being disposed at or below an upper surface 84 of the mounting system 16. Communication with the RFID cassette 14 is facilitated due to close proximity of the RFID tag 36 with the upper surface 84 and the opening of the channel 70. As such, the RFID tag 36 can receive and send signals over a relatively wide angle Θ. In general, the angle Θ is about 90°+/−20° or, more generally, the RFID tag 36 may communicate with any suitable RFID reader that is above or overhead of the RFID tag 36.

Also shown in FIG. 7 is a cross sectional view of a suitable mounting system such as the mounting system 16. In general, the mounting system 16 may include an extruded metal rail or channel. A particularly suitable example of a mounting system includes and extruded aluminum track or frame. Such frames typically include profiles with integrated T-slots or other such attachment systems.

Figure 8:
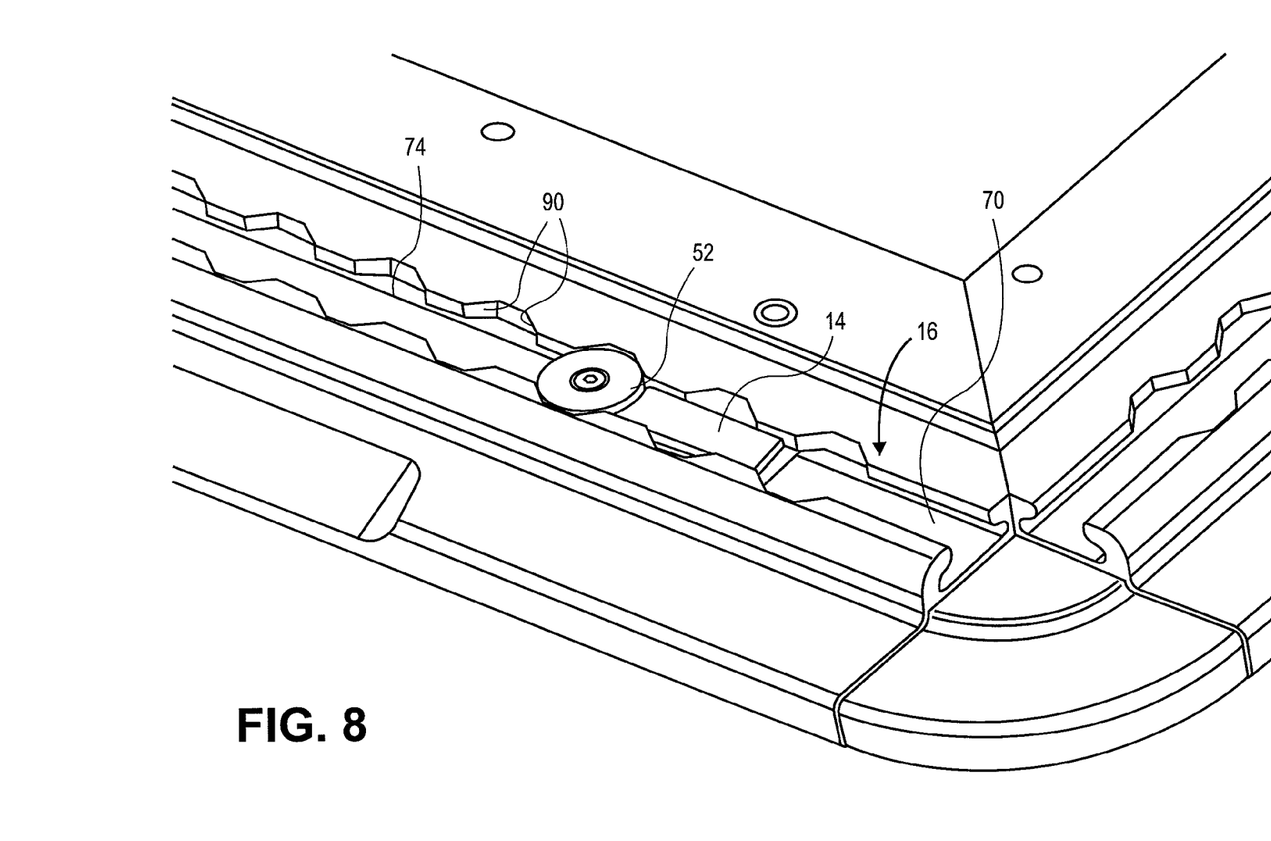
FIG. 8 is a detailed perspective view of the RFID cassette installed in a mounting system according to FIG. 1.

FIG. 8. is a detailed perspective view of the RFID cassette 14 installed in a mounting system 16. As shown in FIG. 8, the RFID cassette 14 is locked into the mounting system 16 via the interaction of the disk 42 and the cutout 74 acting to prevent the RFID cassette 14 sliding along the channel 70. In particular, the side bearing surface is configured to bear against a side lip bearing surface 90 to prevent the RFID cassette 14 sliding along the channel 70.

Figure 9:
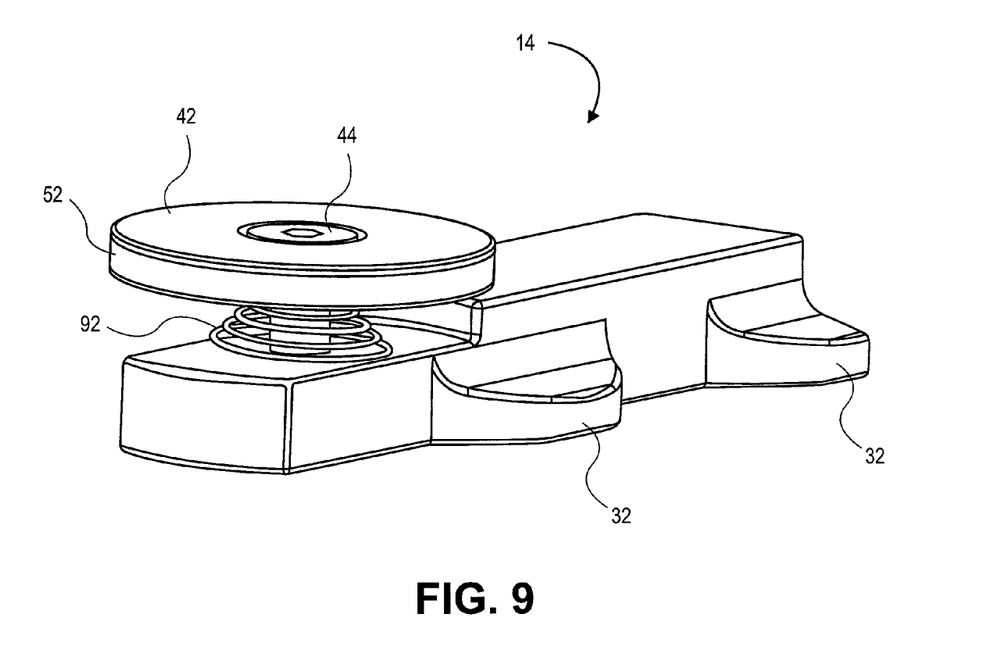
FIG. 9 is a perspective view of the RFID cassette according to FIG. 1 with an optional spring.

FIG. 9 is a perspective view of the RFID cassette 14 according to FIG. 1 with an optional spring 92. As shown in FIG. 9, if included, the spring 92 biases the disk 42 in a raised or disengaged position. More particularly, the spring 92 urges the disk 42 above the channel lip 72 (Shown in FIG. 7) to facilitate insertion, positioning, and/or removal of the RFID cassette 14 from the mounting system 16. The spring 92 may include any suitable spring and/or elastic device. A particular example of a suitable spring includes a conical or volute spring.

Figure 10:
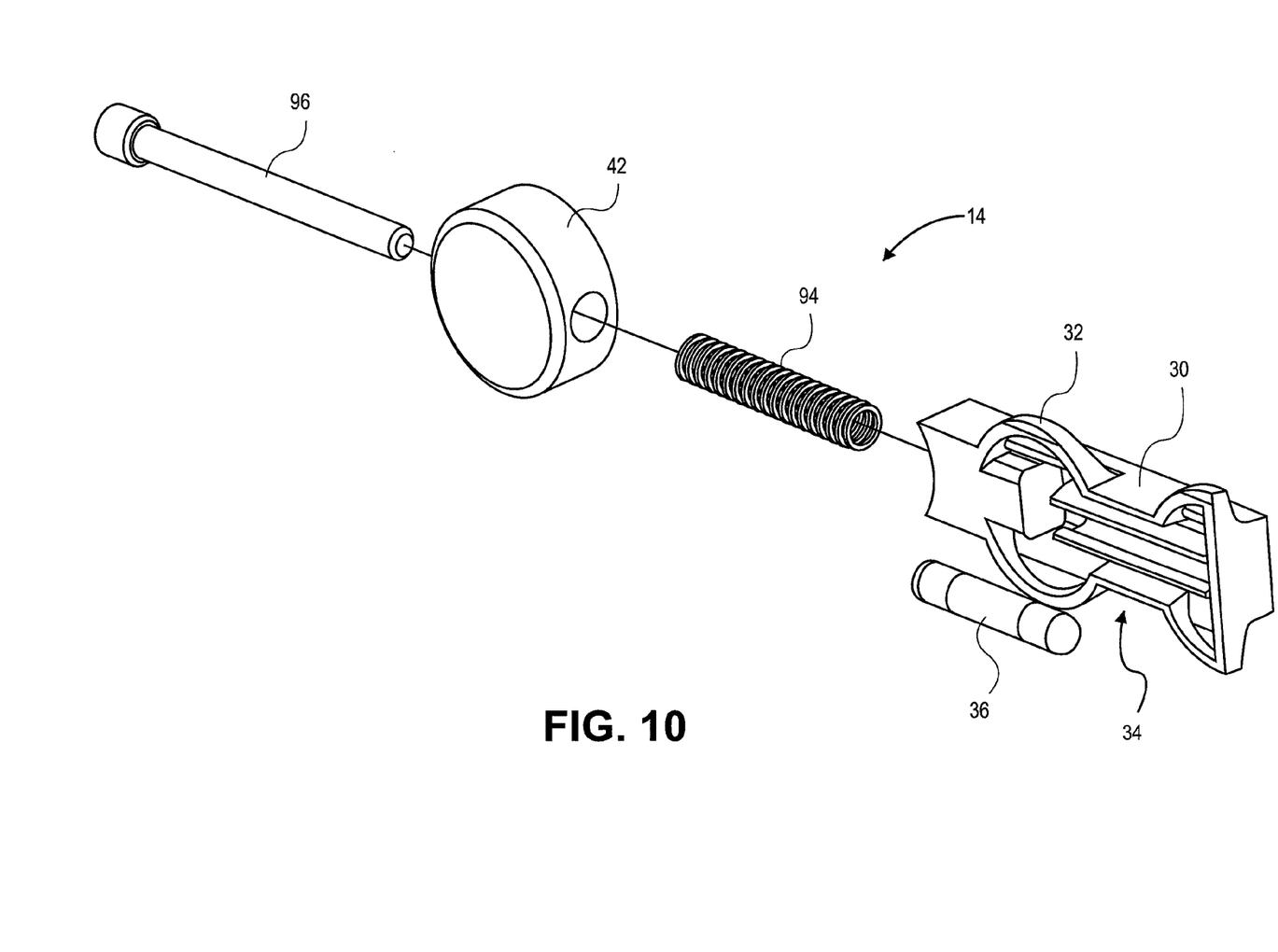
FIG. 10 is an exploded view of an RFID cassette according to another embodiment of the invention.

FIG. 10 is an exploded view of an RFID cassette 14 according to another embodiment of the invention. In general, the RFID cassette 14 according to FIG. 10 is similar to the RFID cassette 14 according to FIGS. 1-9 and thus, in the interest of brevity, those components described hereinabove may not be described again hereinbelow. As shown in FIG. 10, the RFID cassette 14 includes the housing 30, flanges 32, seat 34, RFID tag 36, and disk 42. In addition, the RFID cassette 14 includes a spring 94 and guide rod 96.

In general, the spring 94 may include any suitable spring, elastic device, actuator, and/or the like. In a particular example, the spring 94 includes a conventional compression-type, helically wound, spring. The spring 94 is configured to urge the disk 42 and housing 30 apart.

The guide rod 96 is configured to provide a stop for the disk 42 at a locked position and/or facilitate proper function or alignment of the spring 94. The guide rod 96 may be secured to the housing 30 in any suitable manner. For example, the guide rod 96 may be threadedly secured, press fit, pinned, glued, welded, and/or the like to the housing 30.

Figure 11:
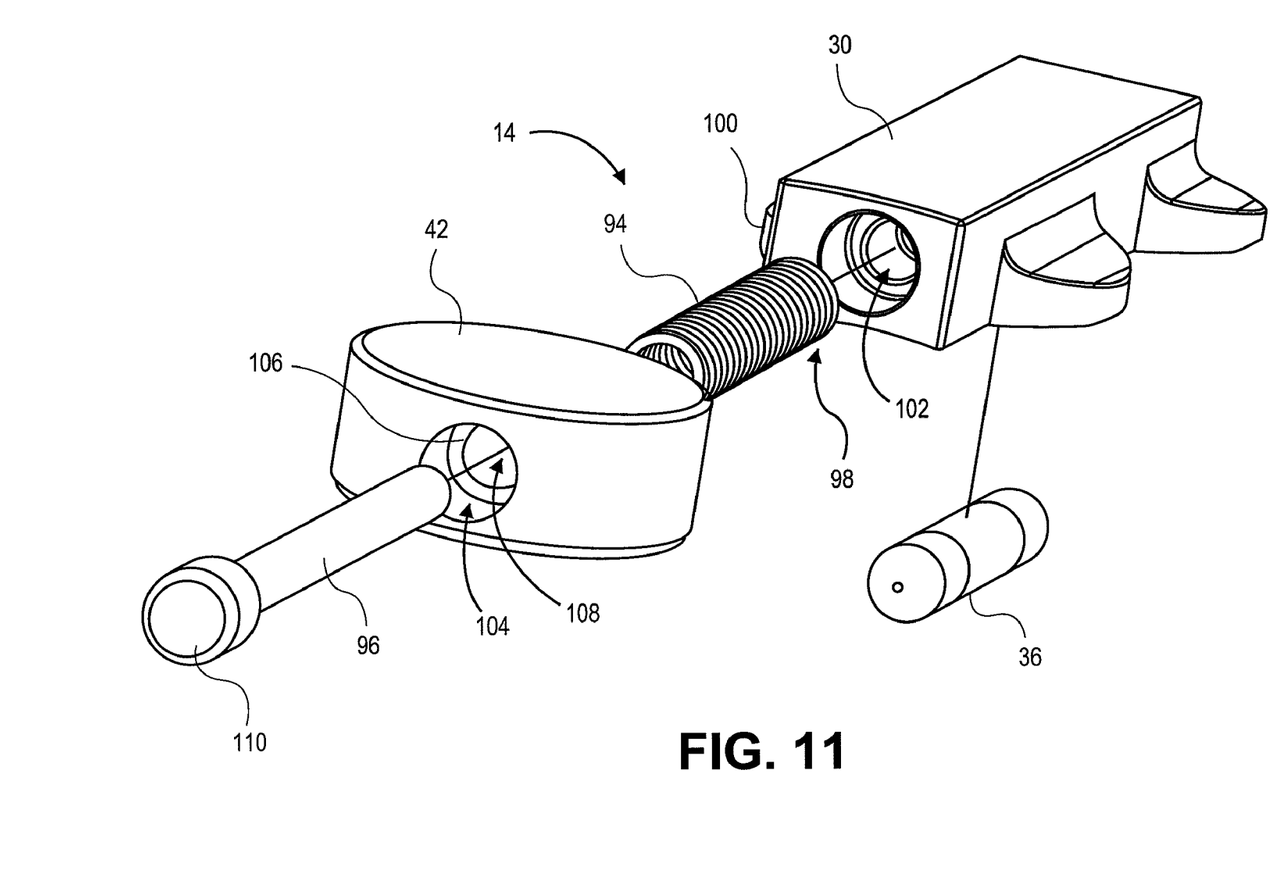
FIG. 11 is another exploded view of an RFID cassette according to FIG. 10.

FIG. 11 is another exploded view of an RFID cassette 14 according to FIG. 10. As shown in FIG. 11, the housing 30 includes a spring bore 98, spring seat 100, and guide rod bore 102. The spring bore 98 is configured to receive the spring 94. The spring seat 100 is configured to provide a bearing surface for the spring 94. The guide rod bore 102 is configured to receive and/or secure a first end of the guide rod 96.

Also shown in FIG. 11, the disk 42 includes a guide rod head bore 104, guide rod head seat 106, and guide rod through hole 108. The guide rod head bore 104 is configured to receive a head 110 of the guide rod 96. The guide rod head seat 106 is configured to provide a stop or bearing surface for the head 110. When assembled, the disk 42 is captured on the guide rod 96 such that the disk 42 may slide along a portion of a length of the guide rod 96. The guide rod through hole 108 is configured to provide a bushing or sleeve to slidably mate with the guide rod 96

Figure 12:
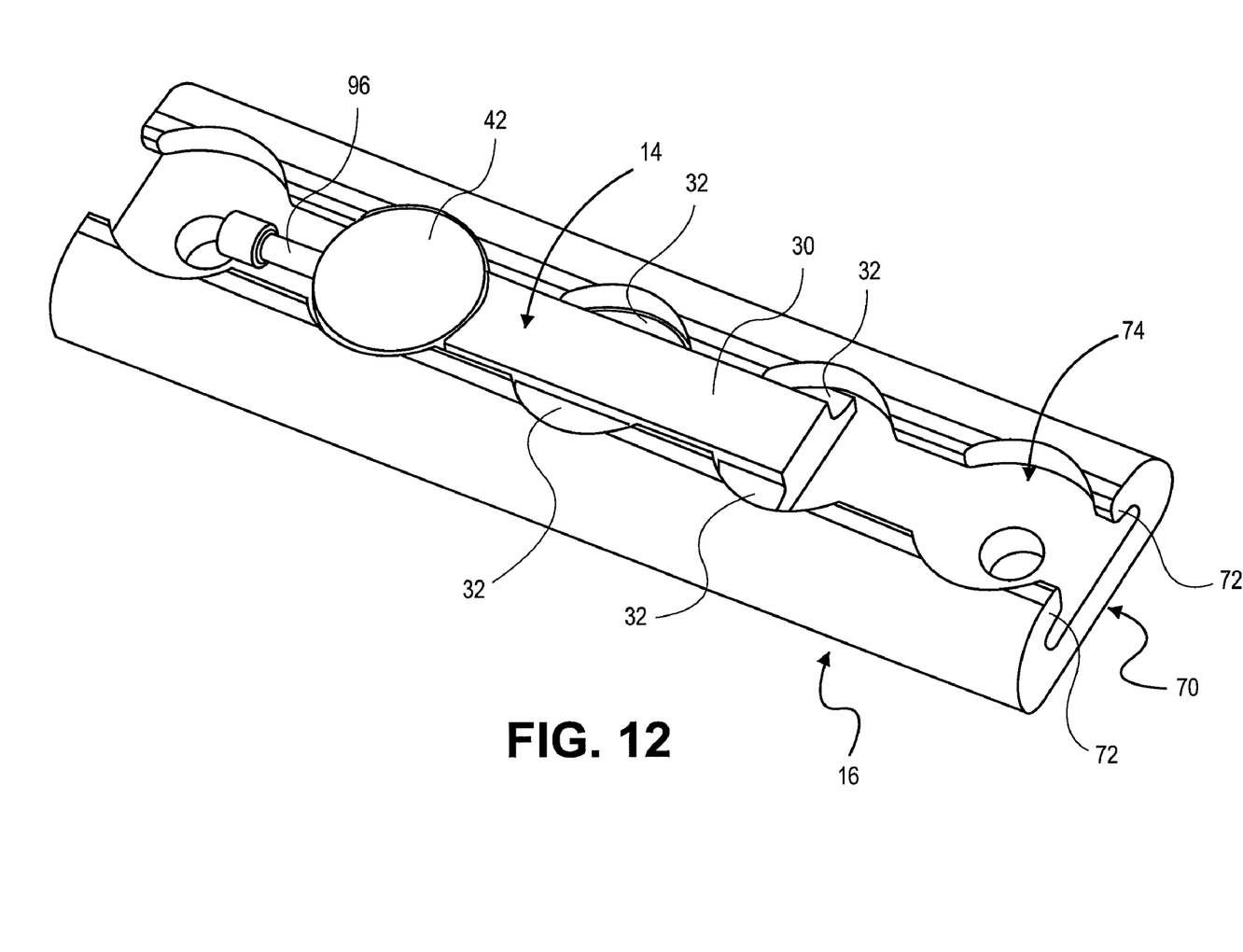
FIG. 12 is a perspective view of the RFID cassette at an initial installation step according to FIG. 10.

FIG. 12 is a perspective view of the RFID cassette 14 at an initial installation step according to FIG. 10. Similar to the illustration of FIG. 5, FIG. 12 shows the mounting system 16 which includes the channel 70 and channel lip 72 with regularly spaced cutouts 74. The spacing of flanges 32 along the housing 30 is configured to match the spacing of the cutouts 74. To insert the RFID cassette 14 into the mounting system 16, the disk 42 is slid along the guide rod 96 towards the housing 30 until the disk 42 matches the spacing of the flanges 32 and cutouts 74. In response to the disk 42 and flanges 32 being spaced to match the cutouts 74, the RFID cassette 14 is operable to drop into the channel 70.

Figure 13:
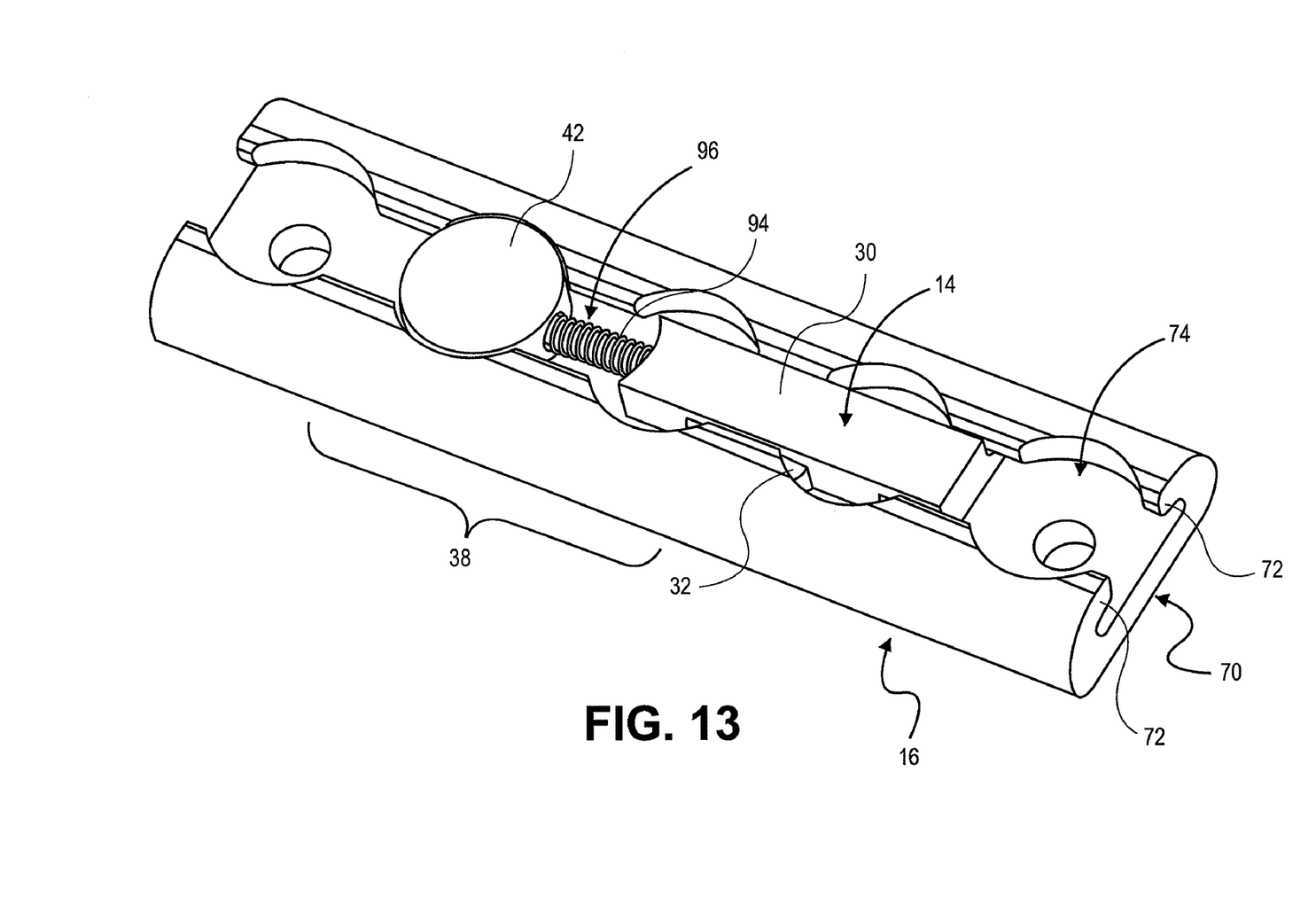
FIG. 13 is a perspective view of the RFID cassette at an second installation step according to FIG. 10.

Of note, the spring 94 (shown in FIGS. 11 and 13) may fully reside within the spring bore 98 (shown in FIG. 11) and/or a spring bore disposed in the disk 42 (not shown). In addition, travel of the disk 42 along the guide rod 96 may be constrained between an insertion/removal position as shown in FIG. 12 and a locked or installed position as shown in FIG. 13. For example, the housing 30 may be configured to stop the disk 42 at the insertion/removal position.

FIG. 13 is a perspective view of the RFID cassette 14 at an second installation step according to FIG. 10. As shown in FIG. 13, in response to the RFID cassette 14 being inserted into the channel 70, the spring 94 is configured to urge the housing 30 to slide away from the disk 42 and along the channel 70. Of note, because the disk 42 is captured within the cutout 72, the disk 42 remains stationary while the housing 30 is moved. Once the travel of the guide rod 96 relative to the disk 42 reaches its limit e.g., the head 110 reaches the guide rod head seat 106 (both shown in FIG. 11), the flanges 32 are configured to be positioned approximately ½ the spacing distance between the cutout 74. In this regard, the disk 42, spring 94, and guide rod 96 function together with the flanges 32 as the lock 38. That is, by urging the flanges 32 in position under the channel lips 72, the RFID cassette 14 is locked or secured in the mounting system 16. Removing the RFID cassette 14 is performed in a reverse manner as compared to installation.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A radio frequency identification ("RFID") pallet system comprising:
    a pallet comprising:
        a panel configured to support a package of cargo;
        an edge disposed about a perimeter of the panel, the edge including an extruded metal rail; and
        a mounting system integrated into the extruded metal rail, the mounting system including a channel and a channel lip, the channel lip including one or more channel lip cutouts;
    a housing configured to mate with the channel;
    a flange extending radially outwardly from the housing, the flange configured to bear upon a lower portion of the channel lip to retain the housing within the channel;
    a seat disposed within a bottom portion of the housing to receive and retain an RFID tag; and
    a lock to secure the housing at a particular location along the channel, the lock comprising a nut, a nut recess disposed in the housing, the nut recess configured to capture the nut, a bolt having a threaded portion configured to mate with the nut, and a disk secured to the housing by the bolt, the disk being configured to seat within a channel lip cutout, the disk being securely seated within the channel lip cutout in response to tightening the bolt.

2. The RFID pallet system according to claim 1, wherein the seat includes a pair of opposing tabs configured to retain the RFID tag by clamping the RFID tag there between.

3. The RFID pallet system according to claim 2, wherein each tab of the pair of opposing tabs extends downward from an upper portion of the housing and includes a lip extending towards a centerline of the housing, the pair of opposing tabs being disposed symmetrically about the centerline.

4. The RFID pallet system according to claim 1, wherein the housing is configured to fit into a groove disposed in the channel lip above the channel.

5. The RFID pallet system according to claim 4, wherein the flange is configured to fit into a channel lip cutout.

6. The RFID pallet system according to claim 1, wherein the disk is offset from the flange and wherein in response to the housing being slid along the channel so as to locate the disk at the channel lip cutout, the flange is disposed below the channel lip to secure the housing in the channel.

7. The RFID pallet system according to claim 1, wherein the housing includes a polymeric material.

8. The RFID pallet system according to claim 7, wherein the polymeric material is essentially transparent to radio signals used to communicate with an RFID tag.

9. A radio frequency identification ("RFID") pallet system comprising:
    a pallet comprising:
        a panel configured to support a package of cargo;
        an edge disposed about a perimeter of the panel, the edge including an extruded metal rail; and
        a mounting system integrated into the extruded metal rail, the mounting system including a channel and a channel lip;
    a housing configured to mate with the channel;
    a flange extending radially outwardly from the housing, the flange configured to bear upon a lower portion of the channel lip to retain the housing within the channel;
    a seat disposed within a bottom portion of the housing to receive and retain an RFID tag; and
    a lock to secure the housing at a particular location along the channel, the lock comprising a guide rod extending axially from an end of the housing, a disk configured to slidably mate with the guide rod, the disk being captured between a distal end of the guide rod and the housing, and a spring configured to urge the housing and the disk apart.

10. The RFID pallet system according to claim 9, wherein the seat includes a pair of opposing tabs configured to retain the RFID tag by clamping the RFID tag there between.

11. The RFID pallet system according to claim 10, wherein each tab of the pair of opposing tabs extends downward from an upper portion of the housing and includes a lip extending towards a centerline of the housing, the pair of opposing tabs being disposed symmetrically about the centerline.

12. The RFID pallet system according to claim 9, wherein the housing is configured to fit into a groove disposed in the channel lip above the channel.

13. The RFID pallet system according to claim 12, wherein the flange is configured to fit into a cutout disposed in the channel lip.

14. The RFID pallet system according to claim 13, wherein the disk is offset from the flange and wherein in response to the housing being slid along the channel so as to locate the disk at the channel lip cutout, the flange is disposed below the channel lip to secure the housing in the channel.

15. The RFID pallet system according to claim 9, wherein the housing includes a polymeric material.

16. The RFID pallet system according to claim 15, wherein the polymeric material is essentially transparent to radio signals used to communicate with an RFID tag.

* * * * *